United States Patent
Jiang et al.

(10) Patent No.: US 11,145,884 B2
(45) Date of Patent: Oct. 12, 2021

(54) METHOD AND APPARATUS OF AN AIR BREATHING HYDROGEN FUEL CELL USING DIRECT LIQUID FUELS

(71) Applicant: U.S. Army Research Laboratory ATTN: RDRL-LOC-I, Adelphi, MD (US)

(72) Inventors: Rongzhong Jiang, Olney, MD (US); Dat Tien Tran, Clarksville, MD (US); Deryn D. Chu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 258 days.

(21) Appl. No.: 16/281,137

(22) Filed: Feb. 21, 2019

(65) Prior Publication Data
US 2020/0274178 A1    Aug. 27, 2020

(51) Int. Cl.
*H01M 8/0656*     (2016.01)
*H01M 8/1011*     (2016.01)

(52) U.S. Cl.
CPC ....... *H01M 8/0656* (2013.01); *H01M 8/1011* (2013.01)

(58) Field of Classification Search
None
See application file for complete search history.

(56) References Cited

U.S. PATENT DOCUMENTS

| 9,127,370 B2 | 9/2015 | Jiang et al. |
| 9,537,162 B2 | 1/2017 | Kwon et al. |
| 9,537,167 B2 | 1/2017 | Jiang et al. |

*Primary Examiner* — Sarah A. Slifka
(74) *Attorney, Agent, or Firm* — Alan I. Kalb

(57) ABSTRACT

Methods and apparatus for generating electric power from a fuel cell are disclosed. In embodiments, a fuel cell for generating electric power includes: a first electrochemical cell including a first electrode and second electrode, wherein the first electrochemical cell is configured to generate a first stage electric power (P1) from a fuel source; and a bi-cell including a second electrochemical cell and third electrochemical cell, wherein the second electrochemical cell includes a third electrode in fluid communication with the fuel source, and a fourth electrode, wherein the second electrochemical cell is configured to generate hydrogen gas from the fuel source and transport the hydrogen gas to a third electrochemical cell, and wherein the third electrochemical cell includes the fourth electrode, and a fifth electrode in fluid communication with a second air source, wherein the fourth electrode is configured for use by the second electrochemical cell as a cathode for hydrogen generation, and by the third electrochemical cell as an anode for hydrogen oxidation, and wherein the third electrochemical cell is configured to generate a second stage electric power (P2).

20 Claims, 6 Drawing Sheets

702

SUPPLYING AIR AND FUEL TO A FUEL CELL COMPRISING: A FIRST, SECOND, AND THIRD ELECTROCHEMICAL CELL, WHEREIN THE FIRST ELECTROCHEMICAL CELL COMPRISES A FIRST ELECTRODE IN FLUID COMMUNICATION WITH AN FIRST AIR SOURCE AND SECOND ELECTRODE IN FLUID COMMUNICATION WITH A FUEL SOURCE, WHEREIN A FIRST ELECTROLYTE MEMBRANE ASSEMBLY IS DISPOSED BETWEEN THE FIRST AND SECOND ELECTRODE, AND WHEREIN THE FIRST ELECTROCHEMICAL CELL IS CONFIGURED TO GENERATE A FIRST STAGE ELECTRIC POWER (P1) FROM THE FUEL SOURCE; WHEREIN THE SECOND ELECTROCHEMICAL CELL COMPRISES A THIRD ELECTRODE IN FLUID COMMUNICATION WITH THE FUEL SOURCE, AND A FOURTH ELECTRODE, WHEREIN A SECOND ELECTROLYTE MEMBRANDE ASSEMBLY IS DISPOSED BETWEEN THE THIRD AND FOURTH ELECTRODE, AND WHEREIN THE SECOND ELECTROCHEMICAL CELL IS CONFIGURED TO GENERATE HYDROGEN GAS FROM THE FUEL SOURCE AND TRANSPORT THE HYDROGEN GAS TO THE THIRD ELECTROCHEMICAL CELL; AND WHEREIN THE THIRD ELECTROCHEMICAL CELL COMPRISES THE FOURTH ELECTRODE, A FIFTH ELECTRODE IN FLUID COMMUNICATION WITH A SECOND AIR SOURCE, AND A THIRD ELECTRODE MEMBRANE ASSEMBLY DISPOSED BETWEEN THE FOURTH ELECTRODE AND THE FIFTH ELECTRODE, WHEREIN THE THIRD ELECTROCHEMICAL CELL IS CONFIGURED TO GENERATE A SECOND STAGE ELECTRIC POWER (P2), WHEREIN THE FOURTH ELECTRODE IS CONFIGURED FOR USE BY THE SECOND ELECTROCHEMICAL CELL AS A CATHODE FOR HYDROGEN GENERATION, AND BY THE THIRD ELECTROCHEMICAL CELL AS AN ANODE FOR HYDROGEN OXIDATION

FIG. 6

METHOD AND APPARATUS OF AN AIR BREATHING HYDROGEN FUEL CELL USING DIRECT LIQUID FUELS

GOVERNMENT RIGHTS IN THIS DISCLOSURE

The invention described herein may be manufactured, used, and licensed by or for the United States Government without the payment of royalties. The U.S. government has certain rights in this disclosure.

FIELD

The present disclosure relates to the field of electrochemistry, and in particular, methods and apparatus for generation of electric power including air-breathing hydrogen fuel cells, direct alcohol fuel cells, and hydrogen generators.

BACKGROUND

A hydrogen fuel cell is an electrochemical device for directly converting the chemical energy of hydrogen into electricity with high efficiency and zero emission. The rapid expanding needs for electric power sources has stimulated the worldwide research and development of fuel cells for powering electric vehicles, portable computers, cellular phones, various electric devices, and the like. Typically, a fuel cell is fabricated by a 2-electrode configuration. For a hydrogen fuel cell, the electrode reactions are: at the anode;

$$2H_2 \rightarrow 4H^+ + 4e^- \quad (E^0 = 0.0V),$$

at the cathode;

$$O_2 + 4H^+ + 4e^- \rightarrow 2H_2O \quad (E^0 = 1.23V); \text{ and}$$

the overall reaction is;

$$2H_2 + O_2 \rightarrow 2H_2O \quad (E^0_{cell} = 1.23V).$$

However, the inventors have found that containerization and transportation of hydrogen gas is problematic for the practical application of hydrogen fuel cells using compressed hydrogen gas tanks as fuel. For example, the inclusion of a hydrogen gas tank problematically lowers the power and energy density of the hydrogen fuel cell. Moreover, known designs may problematically require an external electricity input to operate.

Therefore, the inventors have provided improved methods and fuel cells for generating hydrogen gas, electrical power and mediation of electrochemical reactions and reactant transport. Further the inventors have provided fuel cells that do not require a hydrogen gas tank or external electricity input to operate.

SUMMARY

Methods and apparatus for an electrochemical device such as a hydrogen fuel cell are provided herein. In some embodiments, an apparatus for an electrochemical device includes: a first, second, and third electrochemical cell, wherein the first electrochemical cell includes a first electrode in fluid communication with a first air source, a second electrode in fluid communication with a fuel source, and a first electrolyte membrane assembly disposed between the first and second electrode, wherein the first electrochemical cell is configured to generate a first stage electric power (P1) from the fuel source; wherein the second electrochemical cell includes a third electrode in fluid communication with the fuel source, a fourth electrode, and a second electrolyte membrane assembly disposed between the third and the fourth electrode, wherein the second electrochemical cell is configured to generate hydrogen gas from the fuel source and transport the hydrogen gas to the third electrochemical cell; and wherein the third electrochemical cell includes the fourth electrode, a fifth electrode in fluid communication with a second air source, and a third electrolyte membrane assembly disposed between the fourth electrode and the fifth electrode, wherein the third electrochemical cell is configured to generate a second stage electric power (P2), wherein the fourth electrode is configured for use by the second electrochemical cell as a cathode for hydrogen generation, and by the third electrochemical cell as an anode for hydrogen oxidation.

In some embodiments, an apparatus for an electrochemical device includes a first electrochemical cell including a first electrode and second electrode, wherein the first electrochemical cell is configured to generate a first stage electric power (P1) from a fuel source; and a bi-cell comprising a second electrochemical cell and third electrochemical cell, wherein the second electrochemical cell comprises a third electrode in fluid communication with the fuel source, and a fourth electrode, wherein the second electrochemical cell is configured to generate hydrogen gas from the fuel source and transport the hydrogen gas to a third electrochemical cell, and wherein the third electrochemical cell includes a fourth electrode, and a fifth electrode in fluid communication with a second air source, wherein the fourth electrode is configured for use by the second electrochemical cell as a cathode for hydrogen generation, and by the third electrochemical cell as an anode for hydrogen oxidation, and wherein the third electrochemical cell is configured to generate a second stage electric power (P2).

In some embodiments, a method of generating electric power, includes: supplying air and fuel to a fuel cell including: a first, second, and third electrochemical cell, wherein the first electrochemical cell comprises a first electrode in fluid communication with an first air source and second electrode in fluid communication with a fuel source, wherein a first electrolyte membrane assembly is disposed between the first and second electrode, and wherein the first electrochemical cell is configured to generate a first stage electric power (P1) from the fuel source; wherein the second electrochemical cell comprises a third electrode in fluid communication with the fuel source, and a fourth electrode, wherein a second electrolyte membrane assembly is disposed between the third and fourth electrode, and wherein the second electrochemical cell is configured to generate hydrogen gas from the fuel source and transport the hydrogen gas to the third electrochemical cell; and wherein the third electrochemical cell comprises the fourth electrode, a fifth electrode in fluid communication with a second air source, and a third electrolyte membrane assembly disposed between the fourth electrode and the fifth electrode, wherein the third electrochemical cell is configured to generate a second stage electric power (P2), wherein the fourth electrode is configured for use by the second electrochemical cell as a cathode for hydrogen generation, and by the third electrochemical cell as an anode for hydrogen oxidation.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

FIG. 6 is a process flow of a method of generating electric power in accordance with embodiments, of the present disclosure.

Figure 1:
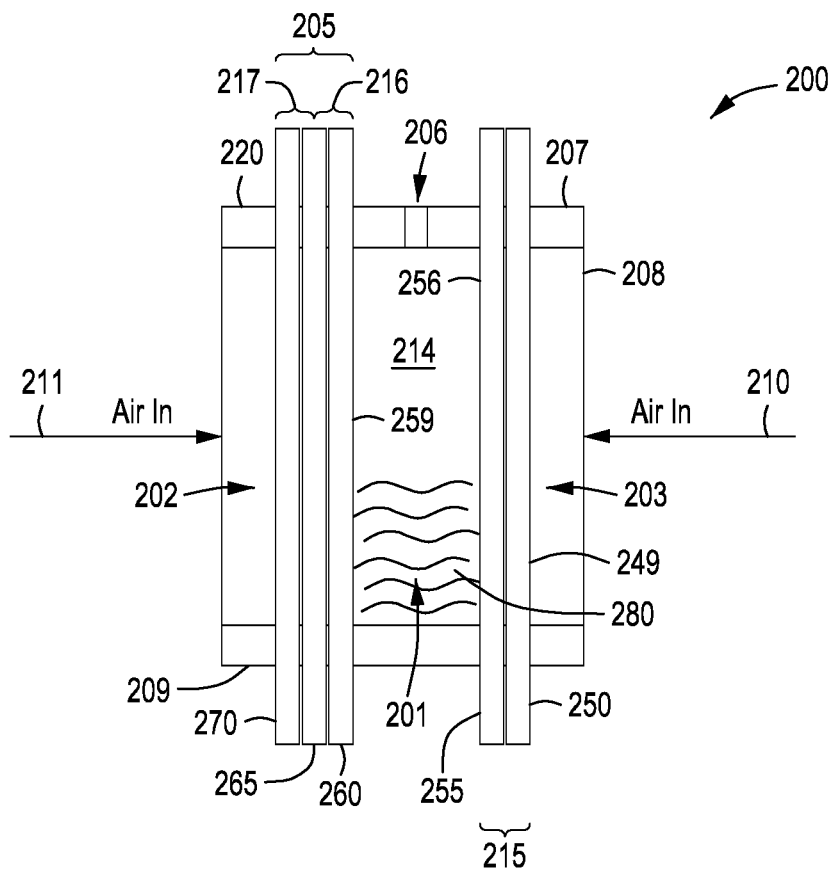
FIG. 1 schematically illustrates a cross-sectional view of an electrochemical device in accordance with some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Methods and apparatus for an electrochemical device such as a hydrogen fuel cell are provided herein. In some embodiments, an apparatus for an electrochemical device includes a first, second, and third electrochemical cell, wherein the first electrochemical cell comprises a first electrode in fluid communication with a first air source, a second electrode in fluid communication with a fuel source, and a first electrolyte membrane assembly disposed between the first and second electrode, wherein the first electrochemical cell is configured to generate a first stage electric power (P1) from the fuel source; wherein the second electrochemical cell comprises a third electrode in fluid communication with the fuel source, a fourth electrode, and a second electrolyte membrane assembly disposed between the third and fourth electrode, wherein the second electrochemical cell is configured to generate hydrogen gas from the fuel source and transport the hydrogen gas to the third electrochemical cell; and wherein the third electrochemical cell comprises the fourth electrode, a fifth electrode in fluid communication with a second air source, and a third electrolyte membrane assembly disposed between the fourth electrode and the fifth electrode, wherein the third electrochemical cell is configured to generate a second stage electric power (P2), wherein the fourth electrode is configured for use by the second electrochemical cell as a cathode for hydrogen generation, and by the third electrochemical cell as an anode for hydrogen oxidation.

Embodiments of the present disclosure relate to a fuel cell including a bi-cell in series with an additional electrochemical cell. A fuel cell in accordance with embodiments of the present disclosure advantageously functions as a direct alcohol fuel cell, a hydrogen generation cell, and a hydrogen fuel cell to increase power and energy density generated in the device. In embodiments, the apparatus of the present disclosure advantageously amplifies power to increase power and energy density. In embodiments, the apparatus of the present disclosure does not require a hydrogen gas tank, external electricity input to operate, an air pump, or fuel pump used in conventional hydrogen fuel cell systems. Embodiments of the present disclosure provide improved electrochemical devices such as air-breathing hydrogen fuel cells provided herein. Embodiments of the present disclosure may include a five-electrode air-breathing fuel cell that advantageously does not need an external input of electricity.

FIG. 1 schematically illustrates a cross-sectional view of an electrochemical device 200 in accordance with some embodiments of the present disclosure. In embodiments, the electrochemical device 200 generally includes a chamber body 207. The chamber body 207 has sidewalls 208, a bottom 209, and a top 220 that define a volume 214. In embodiments, electrochemical device 200 is an air-breathing hydrogen fuel cell including a chamber 201 such as a fuel/water chamber, a first electrode 250, a second electrode 255, a third electrode 260, a fourth electrode 265, a fifth electrode 270, a first air convective window 203, and a second air convective window 202. In some embodiments, electrochemical device 200 comprises three electrochemical cells and five electrodes using self-generated hydrogen to generate electricity. A hole 206 is provided for adding fuel or water to chamber 201 or releasing carbon dioxide from chamber 201.

In some embodiments, electrochemical device 200 includes a first electrochemical cell 215, second electrochemical cell 216, and third electrochemical cell 217. In embodiments, the first electrochemical cell 215 includes a first electrode 250 in fluid communication with a first air source 210 and second electrode 255 in fluid communication with a fuel source 280 in chamber 201. In embodiments, a first electrolyte membrane assembly (not shown in FIG. 1) is disposed between the first electrode 250 and second electrode 255, and the first electrochemical cell 215 is configured to generate a first stage electric power (P1) from the fuel source 280. In embodiments, a second electrochemical cell 216 includes a third electrode 260 in fluid communication with the fuel source 280, and a fourth electrode 265, wherein a second electrolyte membrane assembly (not shown in FIG. 1) is disposed between the third electrode 260 and fourth electrode 265. In embodiments, the second electrochemical cell 216 is configured to generate hydrogen gas from the fuel source 280 and transport the hydrogen gas to the third electrochemical cell 217. In embodiments, the third electrochemical cell 217 includes the fourth electrode 265, a fifth electrode 270 in fluid communication with a second air source 211, and a third electrolyte membrane assembly (not shown in FIG. 1) disposed between the fourth electrode 265 and the fifth electrode 270. In embodiments, the third electrochemical cell 217 is configured to generate a second stage electric power (P2), and the fourth electrode 265 is configured for use by the second electrochemical cell 216 as a cathode for hydrogen generation, and by the third electrochemical cell 217 as an anode for hydrogen oxidation. In some embodiments, chamber 201 is a fuel chamber disposed between the second electrode 255 and third electrode 260. In some embodiments, a first air convection window 203 adjacent the first electrode 250 and a second air convective window 202 is adjacent the fifth electrode 270.

In some embodiments, a first electrochemical cell 215 is an alcohol fuel cell configured to generate a first stage of electric power (P1). In some embodiments, the second electrochemical cell 216 is a fuel processing cell configured to process alcohol or other liquid fuels to generate hydrogen gas. In some embodiments, a third electrochemical cell 217 is a hydrogen fuel cell configured to generate a second stage electric power (P2). In some embodiments, P2 is greater than P1. In some embodiments, the electrochemical device 200 is an air-breathing fuel cell, and the fuel source comprises a liquid.

In embodiments, electrochemical device 200 includes a first electrochemical cell 215 including first electrode 250 and second electrode 255, where the first electrochemical cell 215 is configured for generating a first stage electric power (P1) with alcohol or other liquid fuels provided to an anode side 256 of the first electrochemical cell 215 from chamber 201 such as a fuel chamber. In some embodiments, non-limiting examples of suitable fuel source such as fuel source 280 for use herein includes a methanol ($CH_3OH$) water mixture, methanol, ethanol, ethylene glycol, rubbing alcohol (2-propanol), or the like, and combinations thereof. In some embodiments, fuel may be pre-heated at 20° C., 40° C. and 60° C. or between 20° C. to 60° C. In embodiments where the fuel source 280 is a methanol-water mixture, the mixture may comprise between about 4 vol. percent to about 40 vol. percent methanol and the balance water. In embodiments where the fuel source 280 is a methanol-water mixture, the fuel is oxidized at the anode side 256 of the first electrochemical cell 215. In embodiments, first electrochemical cell 215 is configured for generating a first stage electric power (P1) while first air source 210 provides oxidizing gas such as air to the cathode side 249 of first electrochemical cell 215 from first air convection window 203. In embodiments, fuel source 280 is provided to the anode side 256 of the first electrochemical cell 215 and a first air source 210 such as an oxidizing gas such as air, is provided to the cathode side 249 of the first electrochemical cell 215. In embodiments, first electrochemical cell 215 is a direct alcohol fuel cell and fuel such as fuel source 280 is a methanol, methanol ($CH_3OH$) water mixture, ethanol, ethylene glycol, rubbing alcohol (2-propanol), or combinations thereof. Although not visible in FIG. 1, in embodiments, a first electrolyte membrane assembly is disposed between the first electrode 250 and second electrode 255.

Figure 3A:
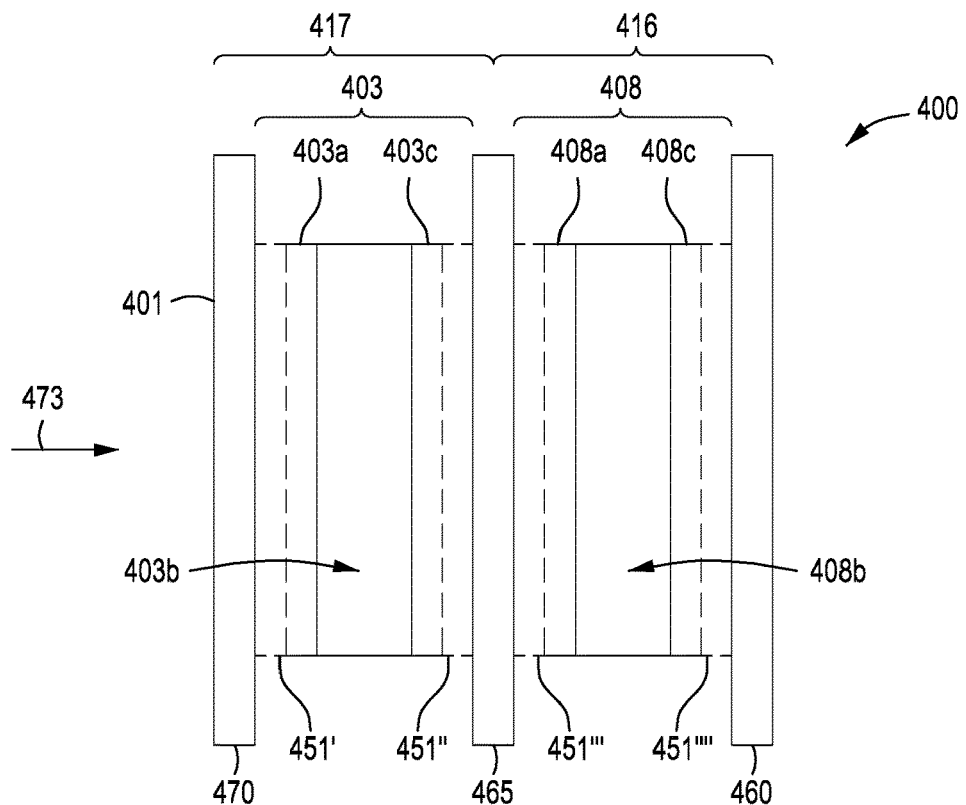
FIG. 3A schematically illustrates a cross-sectional view of a bi-cell including a second electrochemical cell and third electrochemical cell in accordance with some embodiments of the present disclosure.

In embodiments, electrochemical device 200 is a fuel cell including a second electrochemical cell 216 including third electrode 260 and fourth electrode 265. In embodiments, second electrochemical cell 216 is configured for generating hydrogen gas from fuel source 280 and transporting the hydrogen gas to a third electrochemical cell 217. In embodiments, fuel source 280 such as alcohol or other liquid fuels is provided to an anode side 259 of the second electrochemical cell 216 from chamber 201. In embodiments, second electrochemical cell 216 is a hydrogen generation cell. In some embodiments, the second electrochemical cell 216 includes a third electrode 260 in fluid communication with the fuel source 280, and a fourth electrode 265. Although not visible in FIG. 1, in embodiments, a second electrolyte membrane assembly is disposed between the third electrode 260 and fourth electrode 265. A second electrolyte membrane assembly 408 disposed between the third electrode 460 and fourth electrode 465 is shown in FIG. 3A.

In embodiments, electrochemical device 200 includes a third electrochemical cell 217 including fourth electrode 265 and fifth electrode 270. In embodiments, the fifth electrode 270 in fluid communication with a second air source 211 such as second oxidizing gas such as air. In embodiments, the third electrochemical cell 217 is configured to generate a second stage electric power (P2). In embodiments, the fourth electrode 265 is configured for use by the second electrochemical cell 216 as a cathode for hydrogen generation, and by the third electrochemical cell 217 as an anode for hydrogen oxidation. Although not visible in FIG. 1, in embodiments, a third electrolyte membrane assembly is disposed between the fourth electrode 265 and fifth electrode 270. A third electrolyte membrane assembly 403 disposed between fourth electrode 465 and fifth electrode 470 is shown in FIG. 3A.

Still referring to FIG. 1, in embodiments, the second electrochemical cell 216 and third electrochemical cell 217 are combined to form a bi-cell. In embodiments, such as a bi-cell, the fourth electrode 265 is used by second electrochemical cell 216 as a cathode for hydrogen generation and the fourth electrode 265 is used by the third electrochemical cell 217 as an anode for hydrogen oxidation. In embodiments, the fourth electrode 265 is characterized as an A/C junction electrode.

In embodiments, the first electrochemical cell 215, second electrochemical cell 216, and third electrochemical cell 217 may each comprise or consist of a electrolyte membrane assembly or membrane electrolyte assembly (MEA) (not shown in FIG. 1), one or more such as two gas diffusion layers (not shown in FIG. 1), and four or more current collectors such as five electrodes 250, 255, 260, 265, and 270. In some embodiments, a electrolyte membrane assembly or membrane electrolyte assembly (MEA), comprises an acidic membrane, for example, a perfluorosulfonic acid membrane, such as Nafion® (DuPont), or XUS membrane (Dow Chemical), or the like, or an alkaline membrane, composed of, for example, Tokuyama A201 membrane, or the like. In some embodiments, a first, second, or third electrolyte membrane assembly or membrane electrolyte membrane (MEA) is composed of Nafion 117. In some embodiments, a first, second, or third membrane electrolyte membrane (MEA) provide ionic conductivity for ion transport and induce electrochemical reactions at an electrode/electrolyte interface. In embodiments, a electrolyte membrane assembly or membrane electrolyte membrane (MEA) comprises or consists of one polymer electrolyte membrane including a first and second catalyst layer coated on a first and second side of the polymer electrolyte membrane. In embodiments, the current collectors such as electrodes 250, 255, 260, 265, and 270 are made of inert metal or graphite thin plate or film, on which a plurality of engineered holes are uniformly arranged for gas transport.

In some embodiments, a first electrochemical cell 215 is configured for generating a first stage electric power (P1) with alcohol or other liquid fuels such as fuel suitable as a hydrogen source. In embodiments, a second electrochemical cell 216 is configured for generating hydrogen gas with the alcohol or other liquid fuels and transporting the hydrogen gas to a third electrochemical cell 217. In embodiments, a third electrochemical cell 217 is configured as a hydrogen fuel cell for generating a second stage electric power (P2). In some embodiments, alcohol or other organic or inorganic chemicals may be filled into the chamber 201 to continuously generate hydrogen gas, automatically, at low temperature (20-80° C.). In embodiments, an electrochemical device 200 is a hydrogen fuel cell configured to automatically operate with the in situ generated hydrogen gas. In embodiments, power is internally generated in the electrochemical device 200, and in embodiments, P2>P1.

Figure 2A:
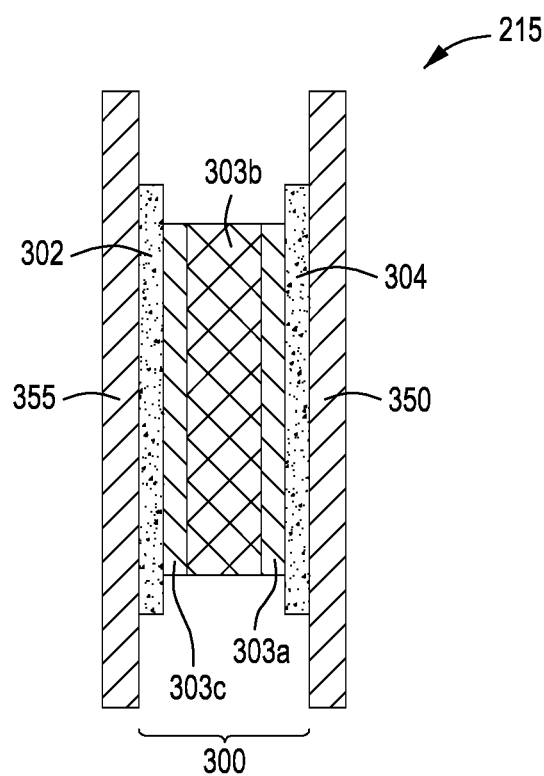
FIG. 2A schematically illustrates a cross-sectional view of first electrochemical cell in accordance with some embodiments of the present disclosure.

Referring now to FIG. 2A, a schematic view of first electrochemical cell 215 suitable for use in accordance with the present disclosure is shown. In embodiments, the first electrochemical cell 215, comprises or consist of a first electrolyte membrane assembly or first membrane electrolyte assembly (MEA) 300, having a first cathode catalyst layer such as catalyst layer 303a is disposed on a first surface of a polymer electrolyte membrane 303b suitable for or configured for oxygen reduction, and a first anode catalyst layer 303c disposed on a second surface of the polymer electrolyte membrane 303b of first membrane electrolyte assembly (MEA) 300 for fuel such as alcohol oxidation. In embodiments, an anode gas diffusion layer such as second gas diffusion layer 302 is disposed upon the first anode catalyst layer 303c suitable for or configured for fuel oxidation. In some embodiments, a cathode gas diffusion layer such as first gas diffusion layer 304 is disposed upon the first cathode catalyst layer such as catalyst layer 303a suitable for oxygen reduction. FIG. 2A includes a first current collector such as first electrode 350 wherein the first electrode 350 is a cathode electrode. FIG. 2A includes a current collector such as second electrode 355 as an anode electrode. In embodiments, a first gas diffusion layer 304, and a second gas diffusion layer 302, are disposed between a first electrode 350 and a second current collector such as second electrode 355. In embodiments, the first membrane electrolyte assembly (MEA) 300 includes polymer electrolyte membrane 303b suitable for proton transfer and comprises or consists of polymer electrolyte membrane 303b including a first and second catalyst layer (catalyst layer 303a and catalyst layer 303c) coated on each side of the polymer electrolyte membrane 303b. In embodiments, the first electrode 350 and second electrode 355 is made of inert metal or graphite thin plate or film, on which many engineered holes are uniformly arranged for rapid gas transport. As shown in FIG. 2A, in some embodiments, the first electrochemical cell 215, comprises or consist of a first electrolyte membrane assembly or first membrane electrolyte assembly (MEA) 300, a polymer electrolyte membrane 303b suitable for or configured for oxygen reduction sandwiched between a first cathode catalyst layer such as catalyst layer 303a and a first anode catalyst layer 303c. In embodiments, first electrolyte membrane assembly or first membrane electrolyte assembly (MEA) 300 is sandwiched between a first gas diffusion layer 30, and a second gas diffusion layer 302. In embodiments, first electrolyte membrane assembly or first membrane electrolyte assembly (MEA) 300, first gas diffusion layer 304, and a second gas diffusion layer 302, are sandwiched between first electrode 350 and second electrode 355.

Still referring to FIG. 2A, first electrode 350 is configured as a cathode current collector located at the right side of the first electrochemical cell 215, and the second electrode 355 is an anode current collector located at the left side of the first electrochemical cell 215. In embodiments, cathode gas diffusion layer (GDL) such as first gas diffusion layer 304 is located at the cathode side of the first electrochemical cell 215 for oxygen transport. In embodiments, an anode gas diffusion layer such as second gas diffusion layer 302 is located at the anode side of the first electrochemical cell 215 for fuel transport. In embodiments, the catalyst layer 303a is cathode catalyst and may be platinum black (Pt) or non-noble metal catalysts. In embodiments, the catalyst layer 303a is disposed between polymer electrolyte membrane 303b and the first gas diffusion layer 304. In some embodiments, the catalyst layer 303a is a first cathode catalyst. In some embodiments, the catalyst layer 303a is a cathode catalyst composed of, for example, platinum black, or a platinum-cobalt (PtCo) alloy, or platinum supported on carbon black (PtC), and combinations thereof. In some embodiments, the catalyst layer 303a is used for cathodic reactions such as oxygen reduction at the cathode or proton reduction at an electrode. In some embodiments, the catalyst layer 303a cathode catalyst is formed using a mixture of 90 weight % platinum black and 10 weight % dry Nafion and coated onto a 0.2 mm carbon cloth and dried at 80 degrees Celsius. In embodiments, weight % refers to percent weight of a total composition. In embodiments, catalyst layer 303c is an anode catalyst and may be an alloy of ruthenium and platinum (PtRu) black or other alloys. In embodiments, the catalyst layer 303c is a first anode catalyst layer disposed between the first polymer electrolyte membrane 303b and the second gas diffusion layer 302. In some embodiments, the catalyst layer 303c is first anode catalyst layer and is an anode catalyst. In some embodiments, the catalyst layer 303c is anode catalyst composed of, for example, platinum-ruthenium (PtRu), or PtSn, or PtMo. In some embodiments, the catalyst layer 303c is an anode catalyst used for anodic reactions such as fuel oxidation at the anode or hydrogen oxidation at an electrode. In some embodiments, the catalyst layer 303c is an anode catalyst formed using a mixture of 85 weight % platinum-ruthenium and 15 weight % dry Nafion coated onto a 0.2 mm carbon cloth and dried at 80 degrees Celsius.

In some embodiments, the first gas diffusion layer 304 and the second gas diffusion layer 302 are hydrophobic to allow permeation of gas while limiting the permeation of water. In some embodiments, the first gas diffusion layer 304 and the second gas diffusion layer 302 comprise Teflon treated carbon cloth, or carbon paper, or a porous metal layer, such as nickel foam, or titanium foam. In some embodiments, the first gas diffusion layer 304 and the second gas diffusion layer 302 have a thickness of about 0.1 to about 0.6 mm, for example about 0.3 mm.

Figure 2B:
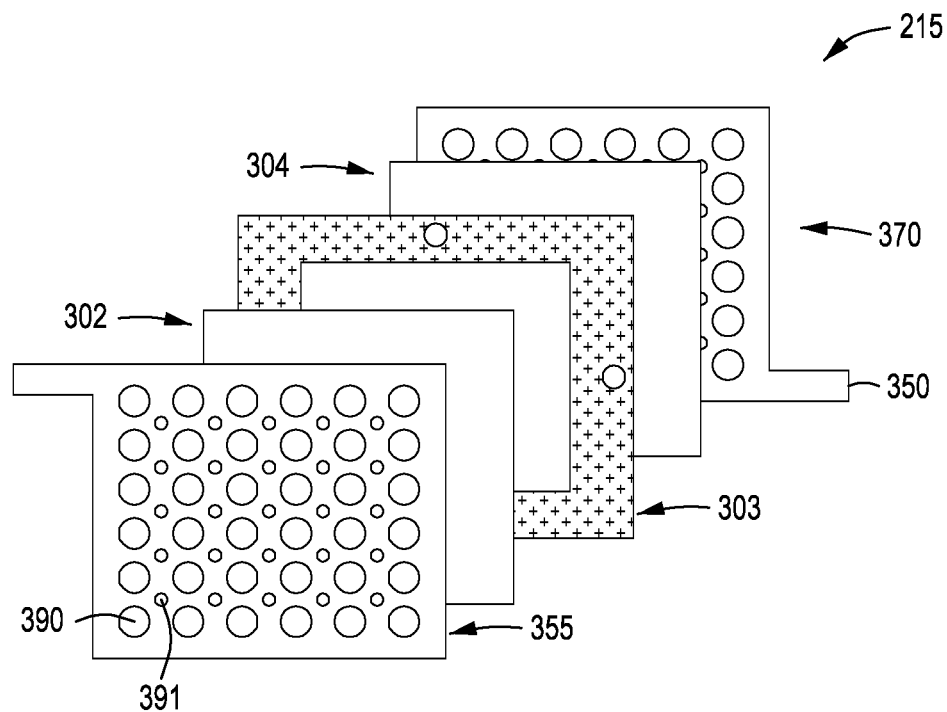
FIG. 2B is an exploded view of a first electrochemical cell in accordance with some embodiments of the present disclosure.
Figure 2C:
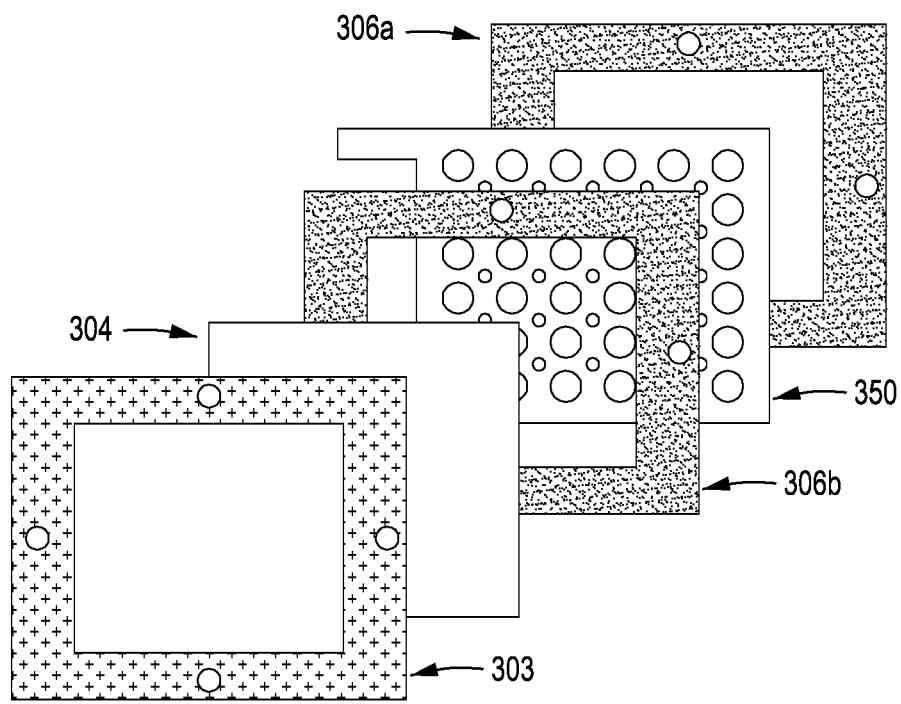
FIG. 2C is an exploded view of a portion of a first electrochemical cell in accordance with some embodiments of the present disclosure.

Referring now to FIG. 2B, an exploded view embodiment of a first electrochemical cell 215 suitable for use in accordance with the present disclosure is shown. Second electrode 355 is configured as anode current collector and located at the left side of the first electrochemical cell 215. In embodiments, first electrode 350 is configured as a cathode current collector and located at the right side of the first electrochemical cell 215. In embodiments, a first gas diffusion layer 304 and a second gas diffusion layer 302 are shown and may comprise carbon cloth or carbon paper for gas and fuel diffusion layers (GDLs). An electrolyte membrane assembly or membrane electrolyte assembly (MEA) 303 configured as a proton exchange membrane coated with catalysts on both sides is shown. In embodiments, first electrode 350 is a cathode current collector and first gas diffusion layer 304 are facing air side 370; and the second electrode 355 configured as a current collector and gas diffusion layer such as second gas diffusion layer 302 are facing fuel/water side disposed within a device of the present disclosure (not shown in FIG. 2B) such as a device of FIG. 1. In embodiments, first electrode 350 and second electrode 355 comprises engineered large holes such as hole 390 and small holes such as hole 391, uniformly arranged. While not shown in FIG. 2B, first electrochemical cell 215 comprises one or more (two) sealing frames such as sealing frame 306a and sealing frame 306b affixed on the back and front of the first electrode 350 and second electrode 355, respectively. For example, referring now to FIG. 2C, a sealing frame 306b and a first gas diffusion layer 304 are positioned between the first electrode 350, and a first membrane electrolyte assembly or MEA 303, as shown in FIG. 2C. The working principle of first electrochemical cell 215 is shown below, if using methanol as a fuel: at the anode;

$$CH_3OH+H_2O=CO_2+6H^++6e^- \ (E^0=0.2V)$$

and the cathode;

$$3/2O_2+6H^++6e^- \rightarrow 3H_2O (E^0=1.23V);$$

where he overall reaction in first electrochemical cell 215 is, $$CH_3OH+3/2O_2=CO_2+2H_2O \ (E^0_{cell}=1.21V).$$

However, in some embodiments, due to over potentials, the open circuit voltage of first electrochemical cell 215 is about 0.7V, and operational at ~0.4V or less. In some embodiments, the first electrochemical cell 215 provides the first stage power (P1) to the second electrochemical cell 216 (See FIG. 1) for process of liquid fuel for hydrogen generation.

FIG. 3A depicts a schematic view of a bi-cell 400 in accordance with some embodiments of the present disclosure. In embodiments, a second electrochemical cell 416 and third electrochemical cell 417 form bi-cell 400. The inventors have observed that the combination of second electrochemical cell 416 and third electrochemical cell 417 in accordance with the present disclosure advantageously achieves fast electron transport, ion transport and hydrogen transport while reducing the total mass of an electrochemical device such as electrochemical device 200. In embodiments, the second electrochemical cell 416 and third electrochemical cell 417 is a combination of two electrochemical cells into one component, such as bi-cell 400. In embodiments, the second electrochemical cell 416 and third electrochemical cell 417 share an electrode such as fourth electrode 465.

In embodiments, the second electrochemical cell 416 includes third electrode 460 and fourth electrode 465. In embodiments, second electrochemical cell 416 is configured for generating hydrogen gas from fuel and transporting the hydrogen gas to the third electrochemical cell 417. In embodiments, second electrochemical cell 416 is a hydrogen generation cell. In some embodiments, the second electrochemical cell 416 includes a third electrode 460 in fluid communication with the fuel source (See fuel source 280 in FIG. 1), and a fourth electrode 465. In embodiments, a second electrolyte membrane assembly 408 disposed between the third electrode 460 and fourth electrode 465 for liquid fuel processing. In embodiments, second electrochemical cell 416 is characterized as a hydrogen generation cell. In embodiments, the second electrochemical cell 416 comprises a second electrolyte membrane assembly 408 including an electrolyte membrane 408b disposed between an anode catalyst layer 408c for liquid fuel oxidation, and a cathode catalyst layer 408a for hydrogen generation. In embodiments, second electrolyte membrane assembly 408 includes an electrolyte membrane 408b disposed between an anode catalyst layer 408c, and a cathode catalyst layer 408a, which are all disposed between anode current collector such as third electrode 460, and cathode current collector or fourth electrode 465. In embodiments, bi-cell 400 comprises one or more gas diffusion layers (shown in phantom as 451', 451'', 451''', and 451''''), and one or more sealing frames (not shown in FIG. 4A). For example, one or more gas diffusion layers such as gas diffusion layer 451'''' as described above may be positioned between anode catalyst layer 408c and third electrode 460 and between cathode catalyst layer 408a and fourth electrode 465 such as gas diffusion layer 451'''. In embodiments, the components of the second electrochemical cell 416 may include the same materials as described above with respect to the first electrochemical cell 215. In embodiments, the working principle of second electrochemical cell 416 is explained below: at the anode;

$$CH_3OH+H_2O=CO_2+6H^++6e^- \ (E^0=0.02V),$$

at the cathode;

$$6H^++6e^- \rightarrow 3H_2 \ (E^0=0.0V),$$

and in embodiments, the overall reaction is:

$$CH_3OH+H_2O=CO_2+3H_2 \ (E^0_{cell}=0.02V).$$

In some embodiments, a second electrochemical cell 416 is configured to generate hydrogen gas for a third electrochemical cell 417 by electrolysis of liquid fuels such as fuel source 280 shown in FIG. 1.

Still referring to FIG. 3A, a third electrochemical cell 417 may comprise a fourth electrode 465 and fifth electrode 470. In embodiments, the fifth electrode 470 is in fluid communication with a second oxidizing gas such as a second air source 473. In embodiments, the third electrochemical cell 417 is configured to generate a second stage electric power (P2). In embodiments, the fourth electrode 465 is configured for use by the second electrochemical cell 416 as a cathode for hydrogen generation, and by the third electrochemical cell 417 as an anode for hydrogen oxidation. In embodiments, a third electrolyte membrane assembly 403 is disposed between the fourth electrode 465 and fifth electrode 470. In embodiments, third electrochemical cell 417 includes a third electrolyte membrane 403b, a cathode current collector or fifth electrode 470 with air side 401, and anode current collector or fourth electrode 465. In some embodiments, the third electrolyte membrane assembly 403 includes an anode catalyst layer 403c for hydrogen oxidation, and catalyst layer 403a for oxygen reduction. In some embodiments, where fourth electrode 465 is shared by third electrochemical cell 417 for an anode and second electrochemical cell 416 for a cathode, fourth electrode 465 is characterized as an A/C junction electrode. In embodiments, one or more gas diffusion layers as described above may be positioned between anode catalyst layer 403c and fourth electrode 465 and between catalyst layer 403a and fifth electrode 470 (see for example gas diffusion layer 451' and gas diffusion layer 451'').

Figure 3B:
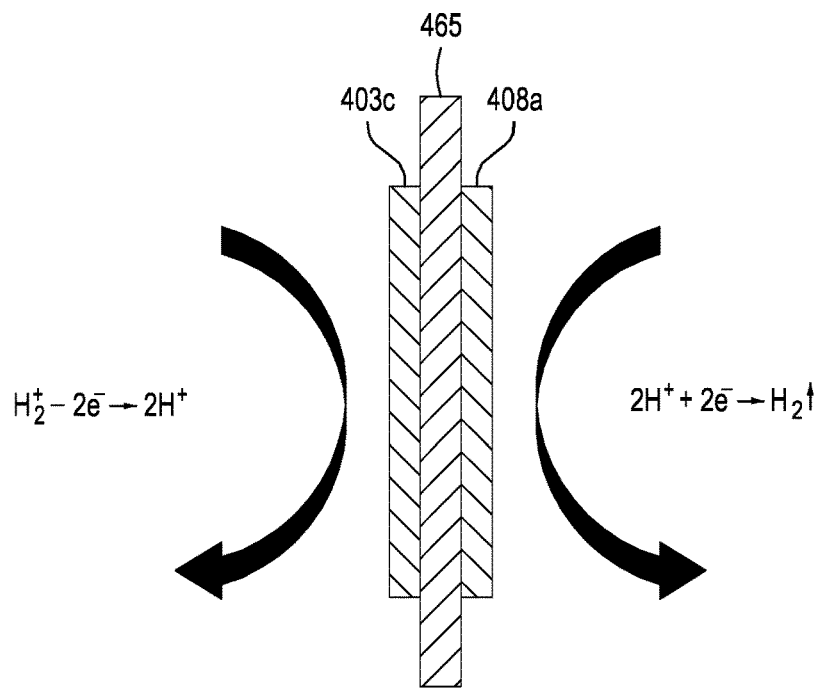
FIG. 3B schematically illustrates a cross-sectional view of an A/C junction electrode in accordance with some embodiments of the present disclosure.

In embodiments, the working principle of an A/C junction electrode such as fourth electrode 465 are shown in FIG. 3B. FIG. 3B includes a schematic view of hydrogen electro-generation and electro-oxidation at fourth electrode 465 configured as an A/C junction electrode, the generated hydrogen gas at the right side is transported to the left side of the fourth electrode 465 configured as an A/C junction electrode through pores or holes in the fourth electrode 465 configured as a current-collector. In embodiments, fourth electrode 465 is disposed between anode catalyst layer 403c and cathode catalyst layer 408a. The electrode reaction adjacent cathode catalyst layer 408a shows:

$$2H^++2e^- \rightarrow H_2;$$

and the electrode reaction adjacent the anode catalyst layer 403c shows:

$$H_2-2e^- \rightarrow 2H^+.$$

Figure 3C:
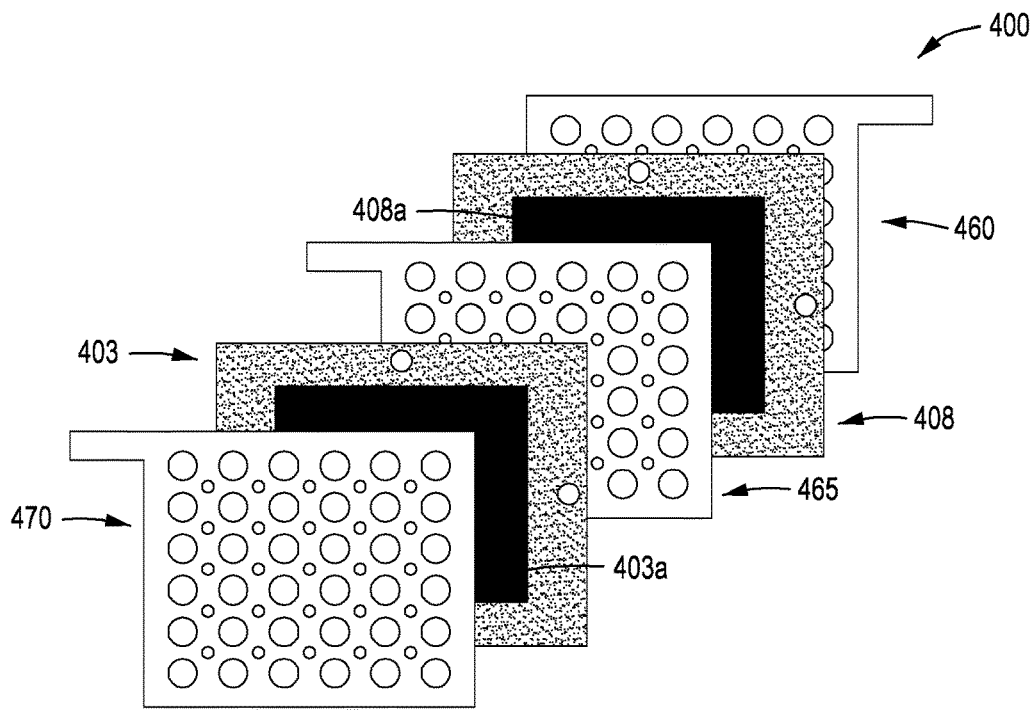
FIG. 3C is an exploded view of a bi-cell in accordance with the present disclosure.

Referring now to FIG. 3C, an exploded view of a bi-cell 400 in accordance with one embodiment of the present disclosure is shown. In embodiments, bi-cell 400 is configured as a hydrogen fuel cell where a second electrolyte membrane assembly 408 is disposed within a second electrochemical cell 416 (not shown in FIG. 3C) configured for using liquid fuels for enhanced electric power generation. In embodiments, fifth electrode 470 is configured as a cathode current collector facing to air convective window (not shown in FIG. 3C). A third electrolyte membrane assembly 403 is provided configured for use in a hydrogen fuel cell. In embodiments, catalyst layer 403a is configured as a cathode catalyst for oxygen reduction, while the anode catalyst (not visible in FIG. 3C) for hydrogen oxidation is coated on the opposite side of the third electrolyte membrane assembly 403. Fourth electrode 465 is shown as a current collector suitable for use in an A/C junction electrode. In embodiments, a second electrolyte membrane assembly 408 is configured for liquid fuel processing. In embodiments, second electrolyte membrane assembly 408 includes cathode catalyst layer 408a for hydrogen generation, while the anode catalyst is coated on the opposite side of a polymer electrolyte membrane for liquid fuel oxidation. In embodiments, third electrode 460 is configured as an anode current collector for second electrolyte membrane assembly 408. In some embodiments, bi-cell 400 comprises a plurality of gas diffusion layers (such as four) and a plurality of sealing frames (such as six) between the second electrolyte membrane assembly 408 and third electrolyte membrane assembly 403 (not visible in FIG. 3C). In some embodiments, the third electrode 460, fourth electrode 465, the fifth electrode 470, second electrolyte membrane assembly 408, third electrolyte membrane assembly 403 of the bi-cell 400 are tightly attached to each other to form one component such as bi-cell 400 shown in FIG. 3A. In some embodiments, the working principle of third electrochemical cell 417 is shown below, at the anode,

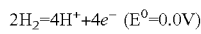
$$2H_2 = 4H^+ + 4e^- \quad (E^0 = 0.0V)$$

at the cathode,

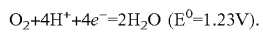
$$O_2 + 4H^+ + 4e^- = 2H_2O \quad (E^0 = 1.23V).$$

In embodiments, the overall reaction is,

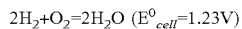
$$2H_2 + O_2 = 2H_2O \quad (E^0_{cell} = 1.23V)$$

Figure 4:
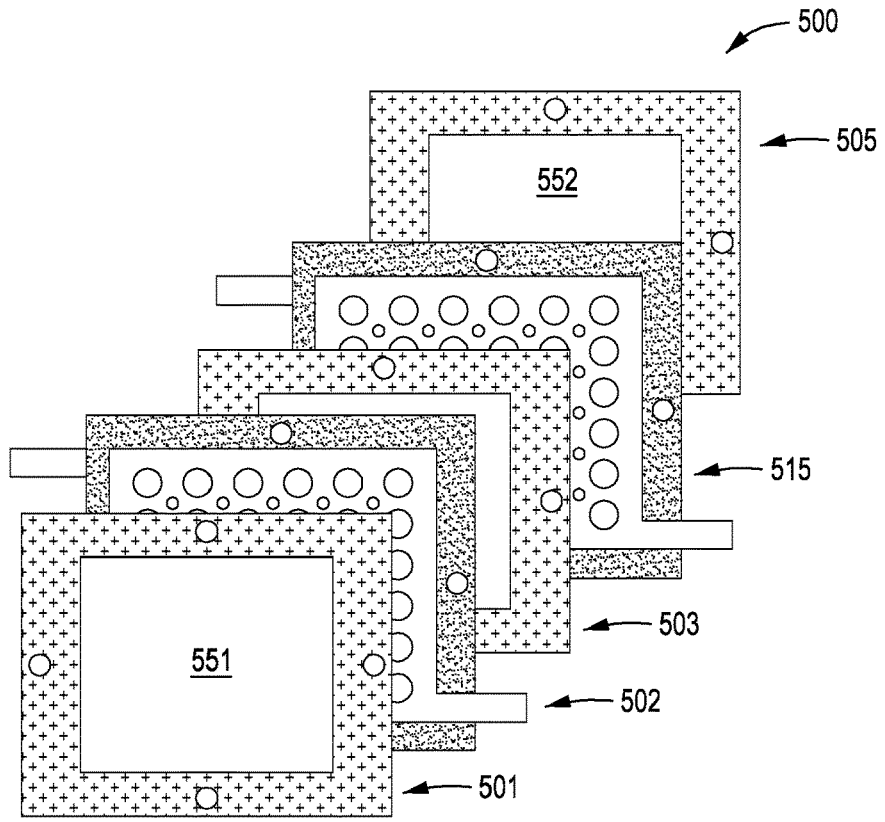
FIG. 4 is an exploded view of an electrochemical device of the present disclosure.

Referring now to FIG. 4, an exploded view of an electrochemical device 500 of the present disclosure is shown such as a whole air-breathing hydrogen fuel cell, composed of a bi-cell 502, a first cell 515, a chamber 503 suitable for holding fuel and/or water, and a first air window 551 and a second air window 552 in backing plate 505 or sealing frame. The chamber 503 and a first air window 551 and a second air window 552 are made of plastic materials to keep electric insulate with electrodes disposed therein, and leaving space for containerizing fuel/water. Embodiments, may include cathode end-plate 501 of a hydrogen fuel cell at the air-side or adjacent a first air window 551. In embodiments, a bi-cell 502 comprising three-electrodes is configured as a hydrogen fuel cell and for hydrogen generation cell as described in FIG. 3A. In embodiments, chamber 503 is suitable or holding liquid fuel. In embodiments, a first cell 515 is configured as an alcohol fuel cell for generation of the first stage electric power (P1). In embodiments, a bi-cell 502 is configured to generate a second stage electric power (P2), where P2>P1. In embodiments, the electrochemical device 500 is configured as an electric power amplifier.

Figure 5:
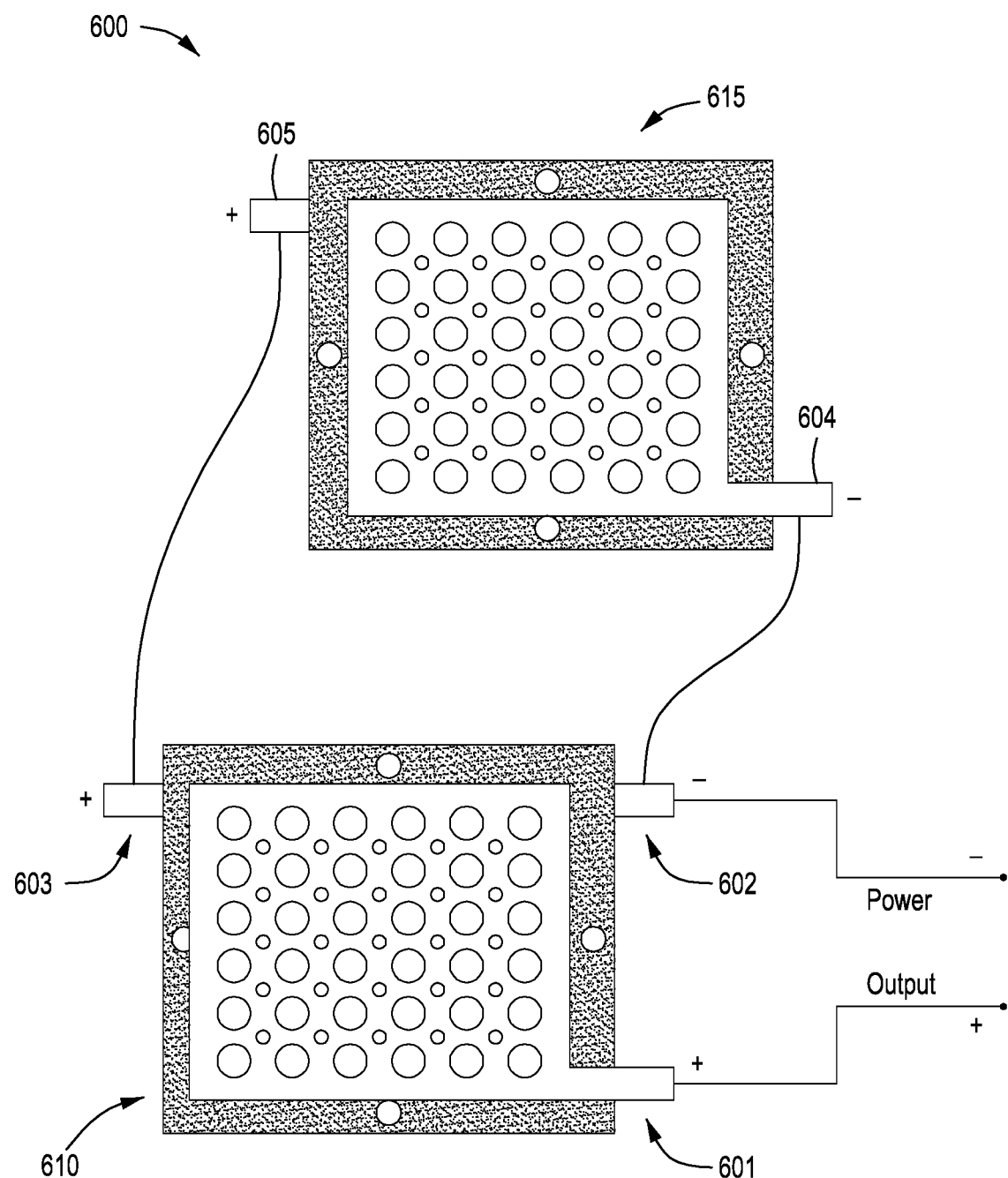
FIG. 5 schematically illustrates a view of electric wire connections of an electrochemical device as described in FIG. 4.

FIG. 5 schematically illustrates a view of electric wire connections of an electrochemical device 600 as described in FIG. 4. In embodiments, electrochemical device 600 comprises a bi-cell 610 and a first electrochemical cell 615 as described above. In embodiments, the first electrochemical cell 615 provides a first stage power, P1, to a second electrochemical cell in the bi-cell 610; the second electrochemical cell provides hydrogen gas for a third electrochemical cell, and the third electrochemical cell in the bi-cell 610 generates a second stage electric power, P2. In embodiments, the electrochemical device 600 comprises a fifth electrode 601 configured as a cathode current collector of a hydrogen fuel cell, a fourth electrode 602 configured as a current collector of an A/C junction electrode, a third electrode configured as an anode current collector for a second electrolyte membrane assembly (not shown in FIG. 5), a second electrode 604 configured as an anode current collector of a first electrolyte membrane assembly (not shown in FIG. 5), and a first electrode 605 configured as a cathode current collector of first electrolyte membrane assembly (not shown in FIG. 5).

FIG. 6 is a process 700 of a method of generating electric power in accordance with embodiments, of the present disclosure. At 702, the process sequence includes supplying air and fuel to a fuel cell including: a first, second, and third electrochemical cell, wherein the first electrochemical cell comprises a first electrode in fluid communication with a first air source and second electrode in fluid communication with a fuel source, wherein a first electrolyte membrane assembly is disposed between the first and second electrode, and wherein the first electrochemical cell is configured to generate a first stage electric power (P1) from the fuel source; wherein the second electrochemical cell comprises a third electrode in fluid communication with the fuel source, and a fourth electrode, wherein a second electrolyte membrane assembly is disposed between the third and fourth electrode, and wherein the second electrochemical cell is configured to generate hydrogen gas from the fuel source and transport the hydrogen gas to the third electrochemical cell; and wherein the third electrochemical cell comprises the fourth electrode, a fifth electrode in fluid communication with a second air source, and a third electrolyte membrane assembly disposed between the fourth electrode and the fifth electrode, wherein the third electrochemical cell is configured to generate a second stage electric power (P2), wherein the fourth electrode is configured for use by the second electrochemical cell as a cathode for hydrogen generation, and by the third electrochemical cell as an anode for hydrogen oxidation. In embodiments, methods include providing a fuel chamber disposed between the second electrode and third electrode. In embodiments, methods comprise filling the fuel chamber with fuel.

However, other embodiments, may include at 702, supplying air and fuel as described herein to an electrochemical device including: a first electrochemical cell comprising a first electrode and second electrode, wherein the first electrochemical cell is configured to generate a first stage electric power (P1) from a fuel source; and a bi-cell comprising a second electrochemical cell and third electrochemical cell, wherein the second electrochemical cell comprises a third electrode in fluid communication with the fuel source, and a fourth electrode, wherein the second electrochemical cell is configured to generate hydrogen gas from the fuel source and transport the hydrogen gas to a third electrochemical cell, and wherein the third electrochemical cell comprises a fourth electrode, and a fifth electrode in fluid communication with a second air source, wherein the fourth electrode is configured for use by the second electrochemical cell as a cathode for hydrogen generation, and by the third electrochemical cell as an anode for hydrogen oxidation, and wherein the third electrochemical cell is configured to generate a second stage electric power (P2). In embodiments, the bi-cell may comprise an A/C junction. In some embodiments, a fuel chamber is disposed between the second electrode and third electrode. In embodiments, a first air convection window is disposed adjacent the first electrode and a second air convention window is disposed adjacent the fifth electrode. In some embodiments, the first electrochemical cell is an alcohol fuel cell configured to generate a first stage of electric power (P1). In some embodiments, a second electrochemical cell is a fuel processing cell configured to process alcohol or other liquid fuels to generate hydrogen gas. In some embodiments, a third electrochemical cell is a hydrogen fuel cell configured to generate a second stage electric power (P2). In some embodiments, P2 is greater than P1. In some embodiments, the electrochemical device is an air-breathing fuel cell, and the fuel is a liquid such as methanol, water, or combinations thereof. In embodiments, 1M to 4M methanol fuel is supplied at 20° C. to 60° C.

In embodiments, the first, second, and third membrane electrolyte assembly (MEA's) may comprise a polymer electrolyte membrane. Non-limiting examples of polymer electrolyte membrane suitable for use in the first, second or third membrane electrolyte assembly (MEA) includes NAFION 117 (0.18 mm thick in dry condition). In embodiments, NAFION 117 electrolyte membrane may be pre-treated in mildly boiling water with 3% $H_2O_2$ for a duration such as two hours, then boiled in 2 M $H_2SO_4$ for a duration such as two hours. For each treatment, the membrane may be washed in de-ionized water 1 to 5 times.

In embodiments, the first, second, and third membrane electrolyte assembly (MEA's) may comprise a cathode catalyst layer formed by combining Platinum (Pt) black and platinum-ruthenium (PtRu) black with a NAFION solution such as a 5% NAFION solution. In embodiments, platinum (Pt) black and platinum-ruthenium (PtRu) black in 50% to 50% (w/w) suitable for use herein are available from Johnson Matthey. Suitable 5% Nafion solution for use herein is available from Aldrich. In embodiments, a cathode catalyst ink may be made with 85% of Pt black and 15% of net Nafion as a binder material. The catalyst ink may be coated on a polymer electrolyte membrane with a vacuum dryer. In some embodiments, NAFION 117 may be attached on the surface of a vacuum dryer at temperature 80° C. In some embodiments, a catalyst ink may be painted on a NAFION 117 membrane surface, and dried at vacuum condition. In some embodiments, a Pt-black ink may be coated on one side of the polymer electrolyte membrane as the cathode. In some embodiments, anode catalyst ink is made with 80% of 50% PtRu, and 20% net Nafion as a binder material. The anode ink is coated on the opposite side of the polymer electrolyte membrane such as Nafion 117 electrolyte membrane by the same vacuum coating method.

In embodiments, the first, second, and third membrane electrolyte assembly (MEA's) may comprise gas diffusion layers (GDLs) as described herein. Non-limiting materials for gas diffusion layers (GDLs) include carbon cloth (ELAT® LT1400) from NuVant Systems Inc. In embodiments, GDLs for anode and cathode were 9 $cm^2$ in cross-sectional area with a 0.45 mm thickness. In embodiments, the Nafion 117 electrolyte membrane coated with Pt and PtRu on both sides is a membrane electrode assembly (MEA). In embodiments, one MEA and two GDLs are sandwiched together, and hot-pressed at 125° C. and 750 psi pressure to be combined together. In embodiments, the catalyst loading for the anode or the cathode was 4 $mg/cm^2$ Pt. In some embodiments, the MEA had a coated area ~9 $cm^2$. In embodiments, the first, second, third, fourth, and fifth electrodes as described herein have an actual active electrode area of ~8 $cm^2$.

While particular embodiments of the present invention have been shown and described, it will be obvious to those skilled in the art that changes and modifications may be made without departing from this invention. Therefore, it is intended that the claims herein are to include all such obvious changes and modifications as fall within the true spirit and scope of this invention.

The invention claimed is:
1. An electrochemical device, comprising:
a first, second, and third electrochemical cell,
wherein the first electrochemical cell comprises a first electrode in fluid communication with a first air source, a second electrode in fluid communication with a fuel source, and a first electrolyte membrane assembly disposed between the first and second electrode, wherein the first electrochemical cell is configured to generate a first stage electric power (P1) from the fuel source;
wherein the second electrochemical cell comprises a third electrode in fluid communication with the fuel source, a fourth electrode, and a second electrolyte membrane assembly disposed between the third and fourth electrode, wherein the second electrochemical cell is configured to generate hydrogen gas from the fuel source and transport the hydrogen gas to the third electrochemical cell; and
wherein the third electrochemical cell comprises the fourth electrode, a fifth electrode in fluid communication with a second air source, and a third electrolyte membrane assembly disposed between the fourth electrode and the fifth electrode, wherein the third electrochemical cell is configured to generate a second stage electric power (P2), wherein the fourth electrode is configured for use by the second electrochemical cell as a cathode for hydrogen generation, and by the third electrochemical cell as an anode for hydrogen oxidation.

2. The electrochemical device of claim 1, further comprising a fuel chamber disposed between the second electrode and third electrode.

3. The electrochemical device of claim 1, further comprising a first air convection window adjacent the first electrode and a second air convention window adjacent the fifth electrode.

4. The electrochemical device of claim 1, wherein the first electrochemical cell is an alcohol fuel cell configured to generate a first stage of electric power (P1).

5. The electrochemical device of claim 1, wherein the second electrochemical cell is a fuel processing cell configured to process alcohol or other liquid fuels to generate hydrogen gas.

6. The electrochemical device of claim 1, wherein the third electrochemical cell is a hydrogen fuel cell configured to generate a second stage electric power (P2).

7. The electrochemical device of claim 1, wherein P2 is greater than P1.

8. The electrochemical device of claim 1, wherein the electrochemical device is an air-breathing fuel cell, and the fuel source comprises a liquid.

9. An electrochemical device comprising:
a first electrochemical cell comprising a first electrode and a second electrode, wherein the first electrochemical cell is configured to generate a first stage electric power (P1) from a fuel source; and a bi-cell comprising a second electrochemical cell and third electrochemical cell, wherein the second electrochemical cell comprises a third electrode in fluid communication with the fuel source, and a fourth electrode, wherein the second electrochemical cell is configured to generate hydrogen gas from the fuel source and transport the hydrogen gas to a third electrochemical cell, and wherein the third electrochemical cell comprises the fourth electrode, and a fifth electrode in fluid communication with a second air source, wherein the fourth electrode is configured for use by the second electrochemical cell as a cathode for hydrogen generation, and by the third electrochemical cell as an anode for hydrogen oxidation, and wherein the third electrochemical cell is configured to generate a second stage electric power (P2).

10. The electrochemical device of claim 9, wherein the bi-cell comprises an A/C junction.

11. The electrochemical device of claim 9, further comprising a fuel chamber disposed between the second electrode and third electrode.

12. The electrochemical device of claim 9, further comprising a first air convection window adjacent the first electrode and a second air convention window adjacent the fifth electrode.

13. The electrochemical device of claim 9, wherein the first electrochemical cell is an alcohol fuel cell configured to generate a first stage of electric power (P1).

14. The electrochemical device of claim 9, wherein the second electrochemical cell is a fuel processing cell configured to process alcohol or other liquid fuels to generate hydrogen gas.

15. The electrochemical device of claim 9, wherein the third electrochemical cell is a hydrogen fuel cell configured to generate a second stage electric power (P2).

16. The electrochemical device of claim 9, wherein P2 is greater than P1.

17. The electrochemical device of claim 9, wherein the electrochemical device is an air-breathing fuel cell, and the fuel source is a liquid.

18. A method of generating electric power, comprising:
supplying air and fuel to a fuel cell comprising:
a first, second, and third electrochemical cell,
wherein the first electrochemical cell comprises a first electrode in fluid communication with an first air source and second electrode in fluid communication with a fuel source, wherein a first electrolyte membrane assembly is disposed between the first and second electrode, and wherein the first electrochemical cell is configured to generate a first stage electric power (P1) from the fuel source;

wherein the second electrochemical cell comprises a third electrode in fluid communication with the fuel source, and a fourth electrode, wherein a second electrolyte membrane assembly is disposed between the third and fourth electrode, and wherein the second electrochemical cell is configured to generate hydrogen gas from the fuel source and transport the hydrogen gas to the third electrochemical cell; and wherein the third electrochemical cell comprises the fourth electrode, a fifth electrode in fluid communication with a second air source, and a third electrolyte membrane assembly disposed between the fourth electrode and the fifth electrode, wherein the third electrochemical cell is configured to generate a second stage electric power (P2), wherein the fourth electrode is configured for use by the second electrochemical cell as a cathode for hydrogen generation, and by the third electrochemical cell as an anode for hydrogen oxidation.

19. The method of claim 18, wherein a fuel chamber is disposed between the second electrode and third electrode.

20. The method of claim 19, comprising filling the fuel chamber with fuel.

* * * * *